though the port 2.

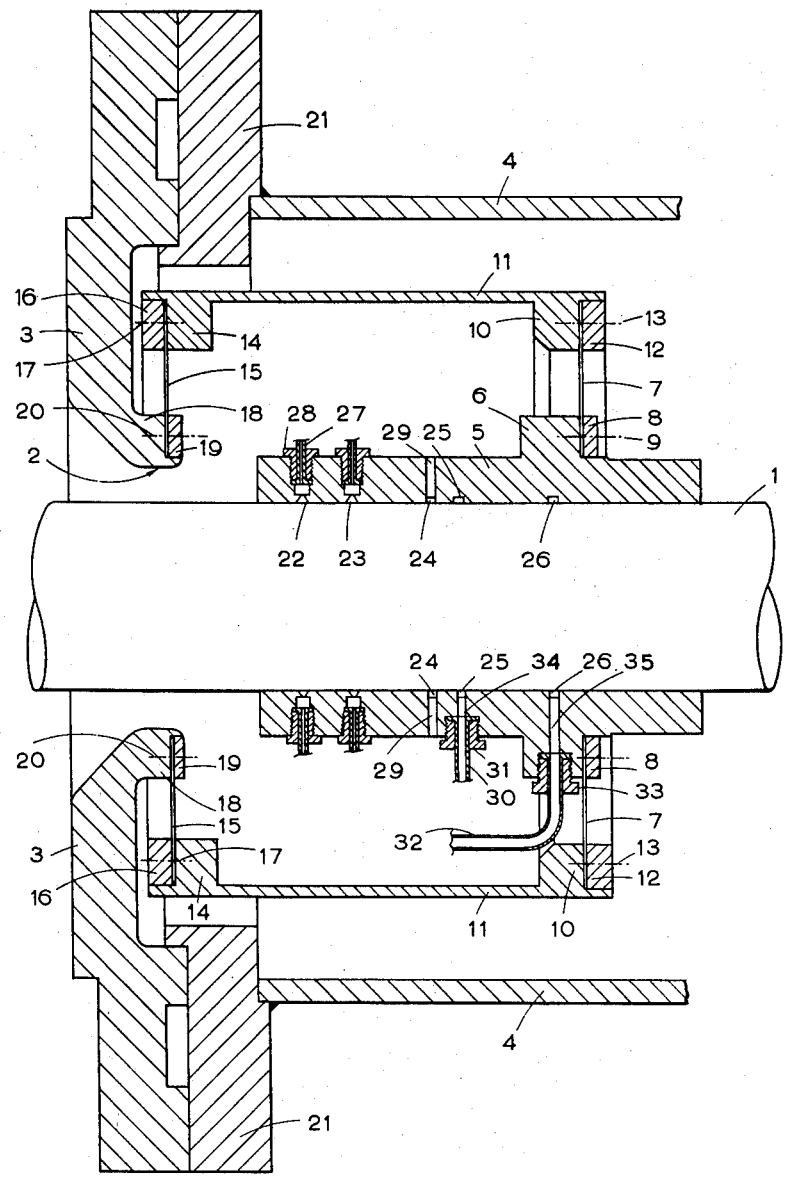

United States Patent Office 3,082,009
Patented Mar. 19, 1963

3,082,009
DEVICES FOR THE SEALING OF A ROTATABLE SHAFT IN PASSAGE THROUGH A CASING
Stanley Whitley, Great Saughall, and David Shaun Allen, Bromborough, Wirral, England, assignors to United Kingdom Atomic Energy Authority, London England
Filed Jan. 14, 1960, Ser. No. 2,381
Claims priority, application Great Britain Jan. 28, 1959
4 Claims. (Cl. 277—1)

This invention relates to devices for the sealing of a rotatable shaft in passage through a casing.

In the field of sealing a rotatable shaft in passage through a casing containing a process gas, it is known to use a gland for the shaft in the form of a body rigidly sealed in the casing and having a bore in which the shaft is loosely located, and to feed a sealing gas (that is, one compatible with the process gas) into the bore at a feed point so that the sealing gas flows in two directions along the clearance space between the shaft and the body, namely towards the inside of the casing (to prevent escape of process gas) and towards the outside of the casing (to prevent ingress of ambient gas). A draw-off point is arranged between the feed point and the inside of the casing so that the sealing gas flowing towards the inside of the casing is drawn off together with that part of the process gas flowing outwardly from the inside of the casing along the clearance space. Whilst the process gas can be recovered after draw-off, the large clearance space required between the shaft and the body in the above type of gland means that a large feed of sealing gas is required and that a correspondingly large draw-off of sealing gas and process gas occurs.

The present invention provides sealing for a rotatable shaft in passage through a sleeve resiliently sealed to a casing, pressurized gas being used to sustain gas lubrication and support between the sleeve and the shaft while a sealing gas is used to prevent inter-mixing between the pressurizing gas and a process gas contained in the casing.

By way of example, the invention will now be described with reference to the single FIGURE of the accompanying drawings which is a sectional elevation.

The drawings show a device for sealing a rotatable shaft 1 passing through a port 2 in an end plate 3 of a casing 4 comprising a sleeve 5 disposed round the shaft and having a flange 6 to which a diaphragm 7 is sealed by a clamping ring 8, the ring 8 being secured by screws (indicated by centre line 9). The diaphragm 7 is healed to a flange 10 on a circular section tube 11 by a clamping ring 12, the ring being secured by screws (indicated by centre lines 13). The tube 11 has a flange 14 to which a diaphragm 15 (similar to the diaphragm 7) is sealed by a clamping ring 16 secured by screws (indicated by centre lines 17). The diaphragm 15 is sealed to a flange 18 on the end plate 3 by a clamping ring 19 secured by screws (indicated by centrel lines 20). The casing 4 has a welded flange 21 to which the end plate 3 is sealed. The sleeve 5 has a first circumferential series of jet orifices 22, a second circumferential series of jet orifices 23, a circumferential groove 24, a circumferential groove 25 and a circumferential groove 26. The orifices 22 and 23 communicate with flange-ended pipes 27 secured in threaded holes in the sleeve 5 by nuts 28. The groove 24 has communicating holes 29 through the sleeve 5. The groove 25 communicates via a hole 34 with a flange-ended pipe 30 secured in a threaded hole in the sleeve 5 by a nut 31. The groove 26 communicates via a hole 35 with a flange-ended pipe 32 secured in a threaded hole in the sleeve 5 by a nut 33. The pipes 27, 30, 32 pass out through the port 2.

The device described above has one application in the pumping of reactive or toxic gases. The reactive or toxic gas is contained in the casing 4, the shaft 1 is motor driven from outside the casing 4, and the end of the shaft 1 inside the casing 4 has an impeller mounted on it. In operation gas, such as air, under pressure is supplied to the orifices 22, 23 via the pipes 27 to provide support for the shaft 1 and lubrication between the shaft 1 and the sleeve 5. The air flows toward the end of the sleeve 5 in communication with the outside of the casing 4 to vent to atmosphere, and also flows in the opposite direction to vent atmosphere via the groove 24 and the holes 29.

Sealing gas, such as nitrogen, under pressure is fed to the groove 25 via the hole 24 and the pipe 30. The nitrogen flows towards the groove 24 to vent to atmosphere with outflowing air through the holes 29 and also flows in the opposite direction towards the groove 26. Some of the nitrogen is drawn off via the hole 35 and the pipe 32, the remainder flowing on to provide an inflow into the casing 4, thereby preventing outflow of the reactive or toxic gas in the casing 4.

Typical dimension are as follows:

| | Inches |
|---|---|
| I.D. of sleeve 5 | 2 |
| O.D. of sleeve 5 | 3 |
| Length of sleeve 5 | 4.8 |
| Length of portion of sleeve 5 containing orifices 22, 23 and groove 24 | 2 |
| Diametral clearance between sleeve 5 and shaft 1 | 0.0010 |
| Depth of grooves 24, 25, 26 | 0.10 |
| Width of grooves 24, 25, 26 | 0.10 |

In a modification of the device described above with reference to the drawings, nitrogen under pressure is fed to the orifices 22, 23 and the circumferential groove 25 and its associated pipework are dispensed with. The nitrogen from the orifices 22, 23 flows towards the end of the sleeve 5 in communication with the outside of the casing 4 to vent to atmosphere, and also flows in the opposite direction. Of the latter part, most vents to atmosphere via the groove 24 and the holes 29, but some flows towards the groove 26 where some is drawn off via the hole 35 and the pipe 32 and the rest flows on to provide an inflow into the casing 4. Also, if a higher inflow rate into the casing 4 can be allowed, the groove 26 and its associated pipework can be dispensed with.

In another application of the device described above with reference to the drawings, the casing 4 forms part of a gas cooled nuclear reactor using, for example, carbon dioxide at twenty-five atmospheres pressure as coolant. The device can be used so that sealing gas flows either into (inleaking arrangement) or out of (outleaking arrangement) the reactor. In the inleaking arrangement pure carbon dioxide at twenty-six atmospheres pressure is fed to the groove 26 and air at twenty-five atmospheres pressure is fed to the groove 25. The pure carbon dioxide flows into the casing 4 and also towards the grooves 25 to mix with the air and vent to atmosphere via the groove 24 and holes 29. In the outleaking arrangement air at twenty-five atmospheres pressure is supplied to the groove 25. Reactor carbon dioxide from the inside of the casing 4 and air from the grooves 25 flow to the groove 26 where the mixture is drawn off at a pressure of twenty-four atmospheres and trapped. In these high pressure applications, a flexible gimbal mounting is required between the sleeve 5 and the plate 3 to prevent axial movement due to the high axial pressure load.

It is practicable to provide the grooves 24, 25, 26 in the surface of the shaft 1 instead of in the sleeve 5, the holes 29, 34, 35 being extended through the sleeve 5 to maintain communication with the grooves.

The resilient sealing of the sleeve 5 to the casing 4 thereby allowing the sleeve to follow deflections of the shaft can be achieved using a bellows but the use of the tube 11 and the diaphragms 7, 15 is preferred as it provides for greater transverse flexibility as compared with a bellows arrangement.

The small (0.0010 inch) diametral clearance between the shaft and the sleeve with the use of gas lubrication and support of the shaft has merit in that a small feed of sealing gas is sufficient and in that inleakage rates and outleakage rates are low.

We claim:

1. A method of operating a sealing device for a shaft in passage through a sleeve flexibly sealed to a casing having atmospheric conditions outside the casing and a gas at a super-atmospheric pressure inside the casing to be kept free of contact with air, comprising feeding pressurized air to a first circumferential zone between the sleeve and the shaft to sustain air lubrication and support between the sleeve and the shaft, the air passing inwardly and outwardly along the sleeve, withdrawing gas at a second circumferential zone on the inward side of said first zone, and feeding a gas compatible with the gas inside the casing and at a pressure greater than said super-atmospheric pressure to a third circumferential zone on the inward side of said second zone.

2. A device for sealing a rotatable shaft in passage through a casing, comprising a sleeve resiliently sealed to the casing and defining a bore for the shaft, the sleeve having a circumferential ring of orifices for feeding pressurized gas to the bore to sustain gas lubrication and support between the sleeve and the shaft, and the sleeve and the shaft defining a series of zones in axial sequence from the ring of orifices towards the end of the sleeve in communication with the inside of the casing, namely, a pressure adjusting zone provided by a first circumferential groove with a hole for venting gas from said first groove, and a sealing gas feed zone provided by a second circumferential groove with means for feeding sealing gas to said second groove.

3. In combination with a rotatable shaft and a casing through which the shaft projects, a device for sealing the shaft in passage through the casing comprising a sleeve resiliently sealed to the casing, the sleeve being disposed round the shaft with a clearance therebetween, the sleeve having defined therein a circumferential ring of orifices for feeding pressurized gas to the clearance to sustain gas lubrication and support between the sleeve and the shaft, and the sleeve having further defined therein, in axial sequence from the ring of orifices towards the end of the shaft in communication with the inside of the casing, a first circumferential groove with a hole for venting gas from said first groove, and a second circumferential groove with means for feeding a sealing to said second groove.

4. In combination with a rotatable shaft and a casing through which the shaft projects, a device for sealing the shaft in passage through the casing comprising a sleeve disposed round the shaft with a clearance therebetween, a tube of circular section concentric with the sleeve, a first annular diaphragm sealed to one end of the tube and to the casing, a second annular diaphragm sealed to the other end of the tube and to the sleeve, and the sleeve having defined therein, in axial sequence from the end of the sleeve in communication with the outside of the casing, first and second circumferential rings of orifices for feeding pressurized gas to said clearance to sustain gas lubrication and support between the sleeve and the shaft, a first internal circumferential groove with a hole for venting gas from said first groove, and a second internal circumferential groove with means for feeding a sealing gas to said second groove.

References Cited in the file of this patent

UNITED STATES PATENTS 1,867,236    Van Rijswijk             July 12, 1932

FOREIGN PATENTS 652,109    Great Britain            Apr. 18, 1951